US010966301B2

(12) United States Patent
Peng et al.

(10) Patent No.: US 10,966,301 B2
(45) Date of Patent: Mar. 30, 2021

(54) LIGHTING METHOD, LIGHTING DEVICE AND LIGHTING SYSTEM

(71) Applicants: LITE-ON ELECTRONICS (GUANGZHOU) LIMITED, Guangzhou (CN); Lite-On Technology Corporation, Taipei (TW)

(72) Inventors: Yao-Chi Peng, Taipei (TW); Kuo-Hui Chang, Taipei (TW); Ming-Hung Chien, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/392,610

(22) Filed: Apr. 23, 2019

(65) Prior Publication Data
US 2020/0229277 A1  Jul. 16, 2020

(30) Foreign Application Priority Data
Jan. 16, 2019  (CN) .......................... 201910040949.7

(51) Int. Cl.
*H05B 47/10*  (2020.01)
*H04N 5/235*  (2006.01)
*G03B 15/03*  (2021.01)
*H05B 45/00*  (2020.01)

(52) U.S. Cl.
CPC ............. *H05B 47/10* (2020.01); *G03B 15/03* (2013.01); *H04N 5/235* (2013.01); *H05B 45/00* (2020.01)

(58) Field of Classification Search
CPC ........ H05B 47/10; H05B 45/00; G03B 15/03; H04N 5/235
See application file for complete search history.

(56) References Cited

U.S. PATENT DOCUMENTS

| | | | |
|---|---|---|---|
| 6,474,837 B1 * | 11/2002 | Belliveau ................ | F21L 4/027 362/231 |
| 9,900,962 B1 * | 2/2018 | Peng ...................... | H05B 47/10 |
| 2006/0034075 A1 * | 2/2006 | Alessio .................. | F21L 4/005 362/202 |
| 2007/0091634 A1 * | 4/2007 | Sakurada ............. | G02B 6/0006 362/555 |

(Continued)

FOREIGN PATENT DOCUMENTS

TW  201235765  9/2012

*Primary Examiner* — Mary Ellen Bowman
(74) *Attorney, Agent, or Firm* — JCIPRNET (57) ABSTRACT

A lighting device including a light emitting module, a light pattern determination module, and a controller is provided. The light emitting module is configured to emit an illumination light. The light pattern determination module includes a first lens and a second lens. The first lens corresponds to a first light pattern, the second lens corresponds to a second light pattern, and the first light pattern is different from the second light pattern. The controller is configured to adjust at least one of the light emitting module and the light pattern determination module, so as to control an illumination light pattern of the illumination light passed through the light pattern determination module. In addition, a lighting method of the lighting device and a lighting system using the lighting device are also provided.

18 Claims, 7 Drawing Sheets

(56) References Cited

U.S. PATENT DOCUMENTS

| | | | |
|---|---|---|---|
| 2011/0080736 A1* | 4/2011 | Brands | F21V 14/065 |
| | | | 362/277 |
| 2012/0213503 A1* | 8/2012 | Gustaffson | H04N 5/2354 |
| | | | 396/164 |
| 2014/0159579 A1* | 6/2014 | Seol | H05B 45/00 |
| | | | 315/85 |
| 2017/0019971 A1* | 1/2017 | Hashimoto | H05B 45/24 |

* cited by examiner

LIGHTING METHOD, LIGHTING DEVICE AND LIGHTING SYSTEM

CROSS-REFERENCE TO RELATED APPLICATION

This application claims the priority benefits of China application serial no. 201910040949.7, filed on Jan. 16, 2019. The entirety of the above-mentioned patent application is hereby incorporated by reference herein and made a part of this specification.

BACKGROUND

Technical Field

The invention relates to a lighting technology. More particularly, the invention relates to a lighting method, a lighting device, and a lighting system capable of adjusting an illumination light pattern.

Description of Related Art

A well-designed street lamp allows the road surface within the lighting region of the street lamp to achieve sufficient and even illuminance. Conventionally, the light distribution provided by a street lamp is designed for a dry and rough road surface, and such light distribution is designed to be symmetrical. Nevertheless, when such design is applied to an actual road, the road surface within the lighting region of the street lamp sometimes cannot achieve the target illuminance.

For instance, in a rainy day, the road surface is no longer dry and rough and becomes slippery and wet, as such, the street lamp which is designed for the dry and rough road surface may lead to uneven illuminance on the road surface. From another perspective, even though the street lamp is designed to provide a symmetrical light pattern, the illuminance of the road surface may show asymmetrical illuminance as affected by other environmental factors such as road surface flatness.

SUMMARY

Accordingly, the invention provides a lighting method, a lighting device, and a lighting system capable of adjusting an illumination light pattern to address the problem in the related art.

A lighting device provided by an embodiment of the invention includes a light emitting module, a light pattern determination module, and a controller. The light emitting module is configured to emit an illumination light. The light pattern determination module includes a first lens and a second lens. The first lens corresponds to a first light pattern, the second lens corresponds to a second light pattern, and the first light pattern is different from the second light pattern. The controller is coupled to the light emitting module and the light pattern determination module and is configured to adjust at least one of the light emitting module and the light pattern determination module, so as to control an illumination light pattern of the illumination light passed through the light pattern determination module.

A lighting method provided by an embodiment of the invention is adapted to a lighting device including a light emitting module and a light pattern determination module. The light pattern determination module includes a first lens and a second lens. The first lens corresponds to a first light pattern, the second lens corresponds to a second light pattern, and the first light pattern is different from the second light pattern. The lighting method includes the following steps. An illumination light is provided through the light emitting module. At least one of the light emitting module and the light pattern determination module is adjusted, so that an illumination light pattern of an illumination light passed through the light pattern determination module is controlled.

A lighting system provided by an embodiment of the invention includes a lighting device and a control host. The lighting device includes a light emitting module, a light pattern determination module, and a controller. The light emitting module is configured to emit an illumination light. The light pattern determination module includes a first lens and a second lens. The first lens corresponds to a first light pattern, the second lens corresponds to a second light pattern, and the first light pattern is different from the second light pattern. The controller is coupled to the light emitting module and the light pattern determination module and is configured to adjust at least one of the light emitting module and the light pattern determination module according to a light pattern adjustment command, so as to control an illumination light pattern of the illumination light passed through the light pattern determination module. The control host is coupled to the lighting device and is configured to generate the light pattern adjustment command.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
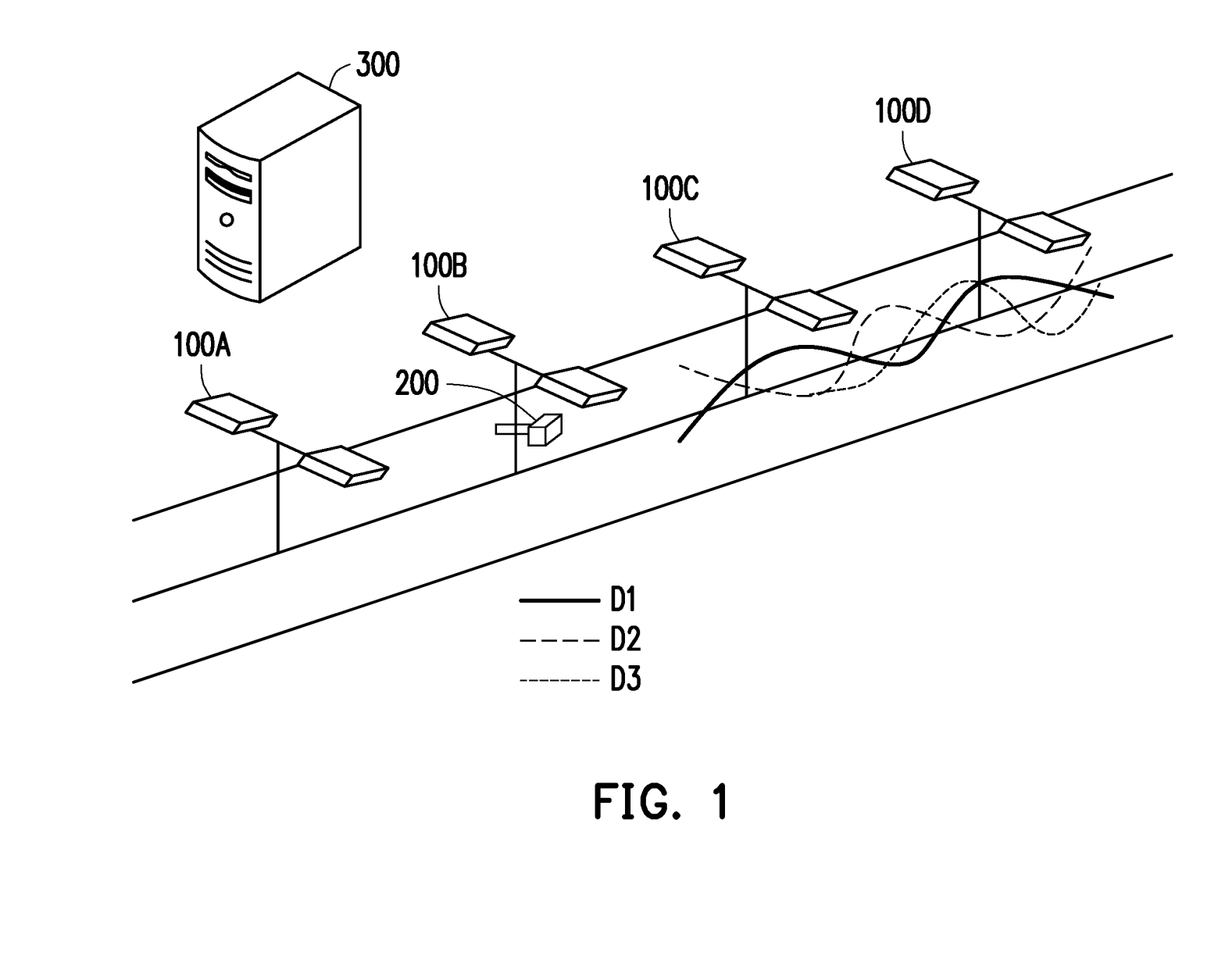
FIG. 1 is a schematic view illustrating a lighting system according to an embodiment of the invention.

FIG. 1 is a schematic view illustrating a lighting system according to an embodiment of the invention. In this embodiment, the lighting system depicted herein is configured to be used to a road or a street. Nevertheless, according to different application needs, the invention is not intended to limit applications of the lighting system in terms of locations or areas.

Generally, conventional street lamps allow a dry and rough road surface to have a symmetrical illuminance distribution D1 corresponding to each of the street lamps. Nevertheless, in a rainy day, as the road surface becomes wet and slippery, the expected illuminance distribution D1 can no longer be maintained, and the road surface illuminance is changed to a symmetrical illuminance distribution D2 corresponding to each of the street lamps. Further, by considering other factors such as weather or uneven road surfaces, another illuminance distribution D3, which is asymmetrical corresponding to each of the street lamps, may also be formed. Therefore, the embodiment provides a lighting system capable of adjusting an illumination light pattern of a lighting device, so that a distribution goal (e.g., maintaining the illuminance distribution D1) of illuminance on a road surface can be achieved.

With reference to FIG. 1, a lighting system includes lighting devices 100A, 100B, 100C, and 100D, an image capturing device 200, and a control host 300, and the control host 300 is coupled to the lighting devices 100A, 100B, 100C, and 100D and the image capturing device 200.

In this embodiment, the lighting devices 100A, 100B, 100C, and 100D are, for example, street lamps disposed beside a road to light up a road surface. In other embodiments, the lighting devices 100A, 100B, 100C, and 100D may also be other types of lamps configured to provide the illumination function. Further, in this embodiment, a number of the lighting devices 100A, 100B, 100C, and 100D is four, but the invention is not intended to limit the number of the lighting devices in the lighting system. In other embodiments, the number of the lighting devices in the lighting system may be one, two, or greater. Similarly, in this embodiment, a number of the image capturing device 200 and a number of the control host 300 are both be one; nevertheless, the invention is not intended to limit the numbers of the image capturing device 200 and the control host 300 in the lighting system as well.

In this embodiment, the image capturing device 200 is, for example, a camera disposed on a lamppost of the lighting device 100B 1.5 meters above the ground and is configured to obtain a current image of a lighting region between the lighting device 100C and the lighting device 100D. Nevertheless, the invention is not intended to limit the type, installation position, and number of the image capturing device 200 as long as the image capturing device 200 is capable of obtaining the current image of the lighting region between the lighting devices. In some embodiments, one image capturing device 200 is disposed corresponding to one lighting device, so as to obtain the current image of the lighting region corresponding to two adjacent lighting devices. In some embodiments, one image capturing device 200 is disposed corresponding to multiple lighting devices, so as to simultaneously obtain the current image corresponding to the multiple lighting regions of the multiple lighting devices. The image capturing device 200 may also adaptively obtain the current image of a specific lighting region of a specific lighting device, which should not be construed as limitations of the scope of the invention.

In addition, in some embodiments, the image capturing device 200 can be adaptively moved, so as to obtain the current image of the lighting region of any lighting device. For instance, the image capturing device 200 may be disposed on a vehicle such as a patrol car, such that the current image captured by the image capturing device 200 may be changed while the lighting device is moving.

In this embodiment, the control host 300 is coupled to the lighting devices 100A, 100B, 100C, and 100D and the image capturing device 200 through a wired or wireless manner, so as to generate a light pattern adjustment command and to transmit the light pattern adjustment command to at least one of the lighting devices 100A, 100B, 100C, and 100D. As such, the at least one lighting device that receives the light pattern adjustment command may adjust an illumination light pattern according to the light pattern adjustment command. Note that in this embodiment, the control host 300 coupled to the lighting devices 100A, 100B, 100C, and 100D and the image capturing device 200 is depicted in a conceptual manner. In order to be compliant with various communication protocols, the embodiment of the invention may adaptively install other software/firmware or cooperate/integrate with other related hardware elements/devices in the control host 300 to perform related operations, which should not be construed as limitations of the scope of the invention.

In some embodiments, the control host 300 may adaptively generate the light pattern adjustment commands according to, for example, current environmental conditions of locations of the lighting devices 100A, 100B, 100C, and 100D. For instance, when detecting that the current environmental condition of the location of the lighting device 100A being switched from a first condition (e.g., sunny day) to a second condition (e.g., rainy day), the control host 300 may correspondingly generate the light pattern adjustment command to the lighting device 100A to change the illumination light pattern of the lighting device 100A. Certainly, in another embodiment, the control host 300 may also simultaneously generate the light pattern adjustment commands to the lighting devices 100A, 100B, 100C, and 100D, so as to correspondingly change the illumination light patterns of the lighting devices 100A, 100B, 100C, and 100D, which should not be construed as limitations of the scope of the invention. In addition, the control host 300 of this embodiment may also be coupled to a processing system including an artificial intelligence algorithm coupled thereto. Moreover, the processing system may also contribute the generation of the light pattern adjustment command according to various types of environmental detection parameters, equipment parameters and/or network resources. Accordingly, the light pattern adjustment command is correspondingly transmitted to the lighting devices 100A, 100B, 100C, and 100D to adjust the illumination light patterns of the lighting devices 100A, 100B, 100C, and 100D, respectively, which should not be construed as limitations of the scope of the invention as well.

In some embodiments, the control host 300 may, for example, obtain the current environmental conditions through environmental detectors (not shown) at the locations of the lighting devices 100A, 100B, 100C, and 100D. In some embodiments, the control host 300 may also pre-record the location of each of the lighting devices 100A, 100B, 100C, and 100D and dynamically obtains current environmental information according to current network information (e.g., weather forecast). In other word, the embodiment of the invention does not intend to limit how the current environmental information is specifically obtained herein.

In some embodiments, the control host 300 receives the current image from the image capturing device 200 and generates the light pattern adjustment command according to the received current image. For instance, if the current image corresponds to the lighting region between the lighting devices 100A and 100B, the control host 300 may generate the light pattern adjustment command according to the current image and transmit the light pattern adjustment command to at least one of the lighting devices 100A, 100B, 100C, and 100D. For instance, while the current illuminance of the lighting region between the lighting devices 100A and 100B is determined, the light pattern adjustment command according to the current illuminance is generated to be transmitted to at least one of the lighting devices 100A and 100B. In some embodiments, the image capturing device 200 continuously obtains the current image corresponding to the lighting region between the lighting devices 100A and 100B and feeds back the current image to the control host 300 again. Accordingly, the control host 300 generates the light pattern adjustment command according to the current image and transmits the light pattern adjustment command to at least one of the lighting devices 100A and 100B, until a current illuminance distribution of the current image meets a predetermined illuminance request.

The predetermined illuminance request may be set according to local regulations and may also be set according to needs of a user, which is not limited by the invention. For instance, the predetermined illuminance request may include that longitudinal (in a direction of the road) uniformity of illuminance (UI) is greater than a predetermined uniformity threshold. Other requirements for the predetermined illuminance request may include that adjusting an illuminance value to be greater than a predetermined illuminance threshold or adjusting a longitudinal illuminance to be symmetrical, which can also be correspondingly adjusted for different needs of the user.

Figure 2A:
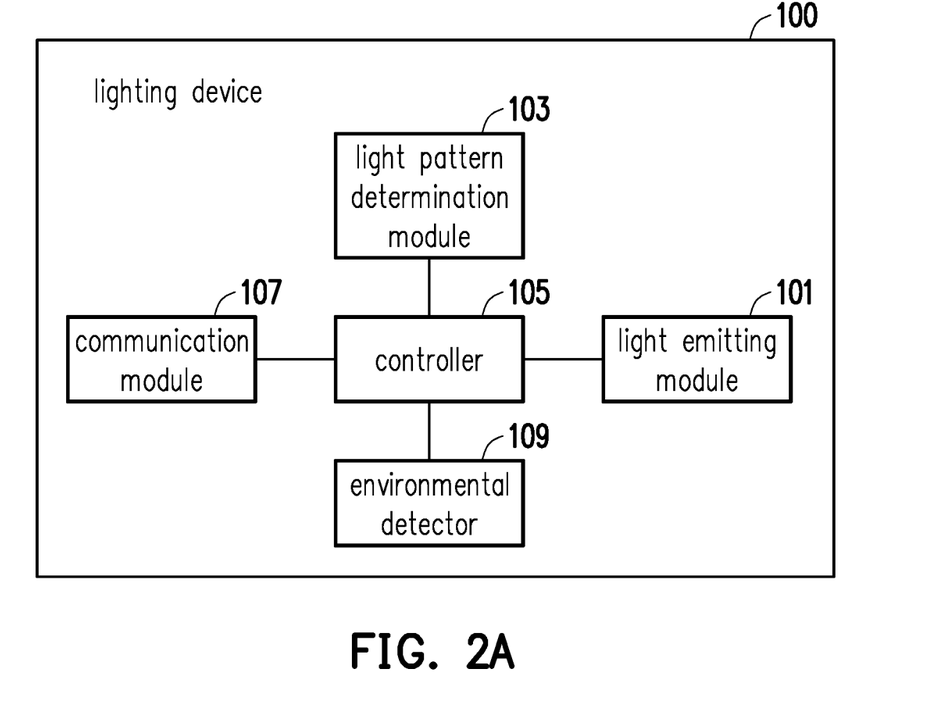
FIG. 2A is a block view illustrating a lighting device according to an embodiment of the invention.
Figure 2B:
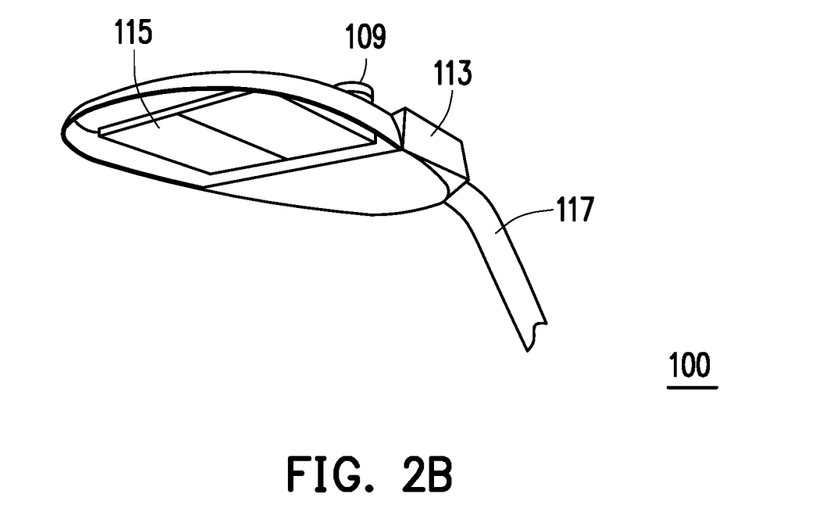
FIG. 2B is a schematic view illustrating the lighting device according to an embodiment of the invention.

FIG. 2A is a block view illustrating a lighting device according to an embodiment of the invention, and FIG. 2B is a schematic view illustrating the lighting device according to an embodiment of the invention. The lighting devices 100A, 100B, 100C, and 100D of FIG. 1 may all be implemented by a lighting device 100 of this embodiment.

With reference to FIG. 2A and FIG. 2B, the lighting device 100 includes a light emitting module 101, a light pattern determination module 103, a controller 105, a communication module 107, and an environmental detector 109. The light emitting module 101, the light pattern determination module 103, the communication module 107, and the environmental detector 109 are all coupled to the controller 105. From a structure perspective, the lighting device 100 includes a lamp base 113, a light source region 115, and a post 117. The controller 105 and the communication module 107 are disposed in the lamp base 113, the light emitting module 101 and the light pattern determination module 103 are disposed in the light source region 115, and the environmental detector 109 is disposed on the lighting device 100 or at other positions which is suitable of detecting the environment for the environmental detector 109.

In this embodiment, the light emitting module 101 may include light emitting elements of any type or number capable of emitting illumination lights, such as LED bulbs and/or the like.

In this embodiment, the light pattern determination module 103 is disposed corresponding to the light emitting module 101 and is configured to determine an illumination light pattern of the lighting device 100. Specifically, an illumination light emitted from the light emitting module 101 passes through the light pattern determination module 103 and then enters an outer portion of the lighting device 100. The light pattern determination module 103 changes a light pattern of the illumination light after the illumination light passes through the light pattern determination module 103.

In this embodiment, the light pattern determination module 103 includes two types of lenses, namely a first lens and a second lens. The first lens corresponds to a first light pattern, the second lens corresponds to a second light pattern, and the first light pattern is different from the second light pattern. Specifically, when a point light source is placed at a center of the first lens, illumination of the point light source generates the first light pattern after passing through the first lens. When the point light source is placed at a center of the second lens, the illumination of the point light source generates the second light pattern different from first light pattern after passing through the second lens.

In this embodiment, the controller 105 may be configured to adjust at least one of the light emitting module 101 and the light pattern determination module 103, so as to control the illumination light pattern of the illumination light emitted from the light emitting module 101 and passed through the light pattern determination module 103. In some embodiments, the controller 105 may be a computing unit featuring computing capability, such as a central processing unit (CPU), a system-on-chip (SOC), an application processor, a media processor, a microprocessor, a digital signal processor, a programmable controller, an application specific integrated circuit (ASIC), a programmable logic device (PLD), or other similar devices or a combination of the foregoing devices, which is not limited by the invention in this regard.

Two embodiments are provided as follows to describe controlling the illumination light pattern of the illumination light emitted from the light emitting module 101 and passed through the light pattern determination module 103 via adjustment of the light emitting module 101 and/or the light pattern determination module 103.

Figure 3A:
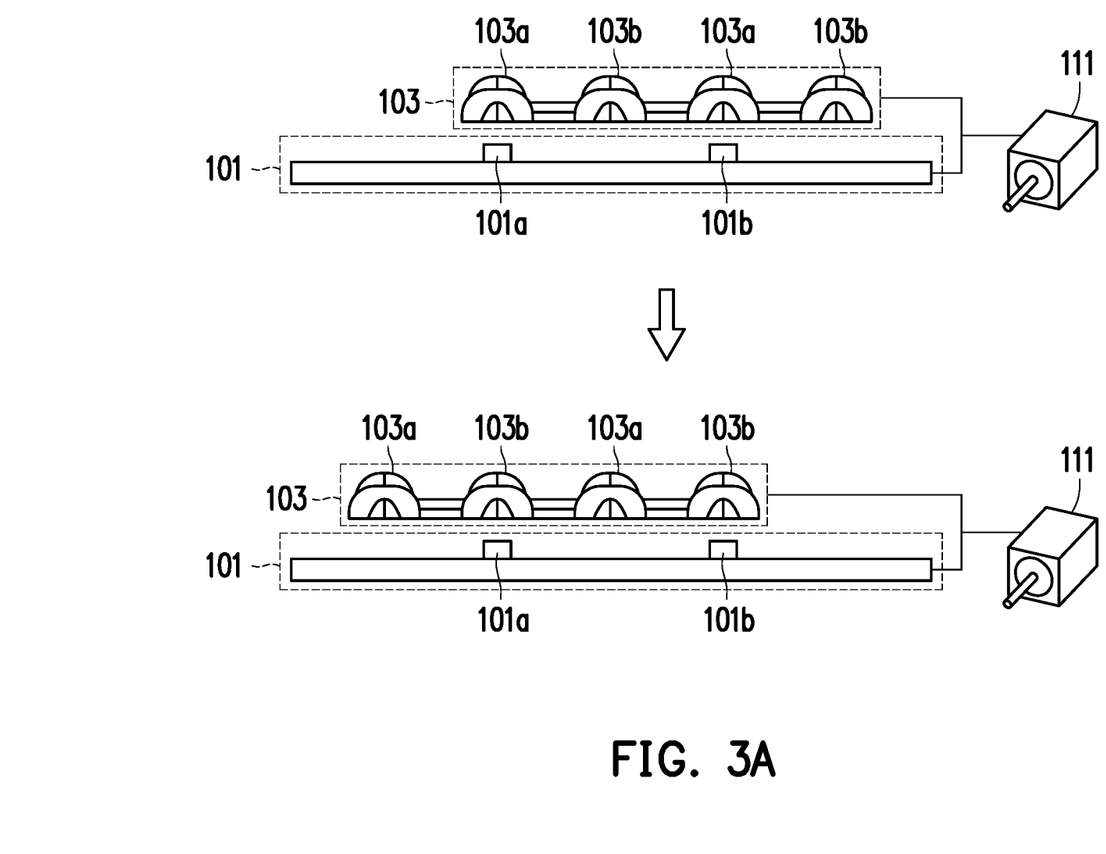
FIG. 3A is a schematic view illustrating adjustment of a light pattern determination module according to an embodiment of the invention.
Figure 3B:
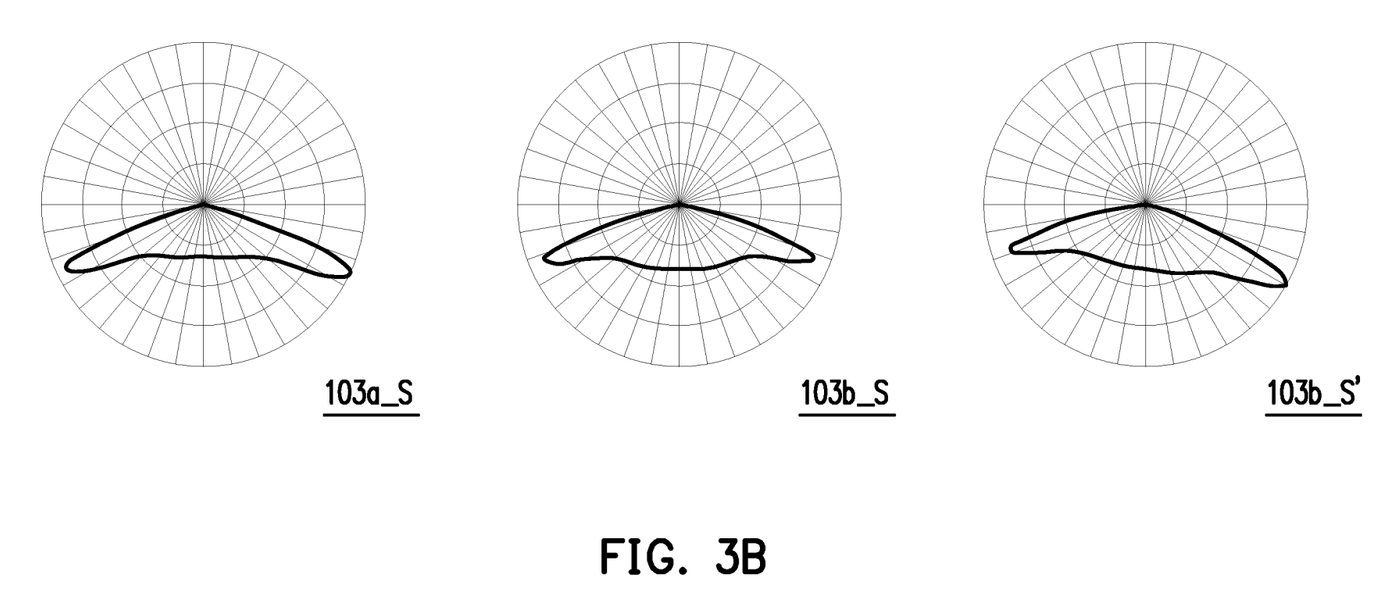
FIG. 3B is a schematic view illustrating a plurality of light patterns according to an embodiment of the invention.

FIG. 3A is a schematic view illustrating adjustment of a light pattern determination module according to an embodiment of the invention, and FIG. 3B is a schematic view illustrating a plurality of light patterns according to an embodiment of the invention.

In this embodiment, the lighting device 100 further includes a motor 111. At least one of the light emitting module 101 and the light pattern determination module 103 is coupled to the motor 111, and the motor 111 is coupled to the controller 105. Via the motor 111, the controller 105 may move the light emitting module 101 and/or the light pattern determination module 103. As such, a relative position between the light emitting module 101 and the light pattern determination module 103 is adjusted, so as to determine the illumination light pattern of the illumination light emitted from the light emitting module 101 and passed through the light pattern determination module 103.

With reference to FIG. 3A and FIG. 3B, the light pattern determination module 103 includes first lenses 103a and second lenses 103b, where the first lenses 103a corresponds to a first light pattern 103a_S, and the second lenses 103b correspond to a second light pattern 103b_S. When positions of light emitting elements 101a and 101b of the light emitting module 101 both correspond to centers of the first lenses 103a (the illustration above the arrow shown in FIG. 3A), the illumination light pattern of the illumination light emitted from the light emitting module 101 and passed through the light pattern determination module 103 is determined by the symmetrical first light pattern 103a_S. Moreover, when the positions of the light emitting elements 101a and 101b of the light emitting module 101 both correspond to centers of the second lenses 103b (the illustration below the arrow shown in FIG. 3A), the illumination light pattern of the illumination light emitted from the light emitting module 101 and passed through the light pattern determination module 103 is determined by the symmetrical second light pattern 103b_S. In addition, the motor 111 may finely adjust distances (e.g., 0.2 millimeter to 0.5 millimeter)

between the light emitting elements 101*a* and 101*b* of the light emitting module 101 and the centers of the lenses. For instance, when the motor 111 adjusts both the positions of the light emitting elements 101*a* and 101*b* of the light emitting module 101 to be corresponding to positions which are deviated from the centers of the second lenses 103*b* by 0.2 millimeter, the illumination light pattern of the illumination light emitted from the light emitting module 101 and passed through the light pattern determination module 103 is determined by an asymmetrical third light pattern 103*b*_S'. Accordingly, the controller 105 can adjust the illumination light pattern of the illumination light emitted through controlling the motor 111 only, so as to control the illuminance distribution in the lighting region corresponding to the lighting device 100.

In the foregoing embodiment, both the first lenses 103*a* and the second lenses 103*b* correspond to symmetrical light patterns, but the invention is not limited thereto. In other embodiments, the first lenses 103*a* and the second lenses 103*b* may correspond to an asymmetrical light pattern. As such, when a light bulb is located at the center of the first lens 103*a* or at the center of the second lens 103*b*, the light can also form an asymmetrical light pattern after passing through the first lens 103*a* or the second lens 103*b*.

Note that although the light emitting module 101 in FIG. 3A is depicted as two light emitting elements 101*a* and 101*b* and two first lenses 103*a* and two second lenses 103*b* are depicted for the light pattern determination module 103, such illustration is not intended to limit the invention. For instance, the light emitting elements 101*a* and 101*b* in the light emitting module 101 may be, for example, arranged in an array, and odd columns of the array are constituted by the light emitting elements 101*a* and the even columns of the array are constituted by the light emitting elements 101*b*. Alternatively, the first lenses 103*a* and the second lenses 103*b* in the light pattern determination module 103 may also be, for example, arranged in an array corresponding to the light emitting elements as the array in the light emitting module 101, where odd columns in the array are constituted by the first lenses 103*a* and even columns are constituted by the second lenses 103*b*.

Besides, in some embodiments, in addition to adjusting the relative position between the light emitting module 101 and the light pattern determination module 103 through the motor 111, the controller 105 may further selectively light up the light emitting elements 101*a* and 101*b* according to installation positions of the light emitting elements 101*a* and 101*b* in the light emitting module 101, so as to control the illuminance distribution in the lighting region corresponding to the lighting device 100. For instance, the controller 105 may suitably select to light up one single or several light emitting elements in different columns or rows in the light emitting module 101, so as to adjust the illuminance distribution in the lighting region.

Figure 4A:
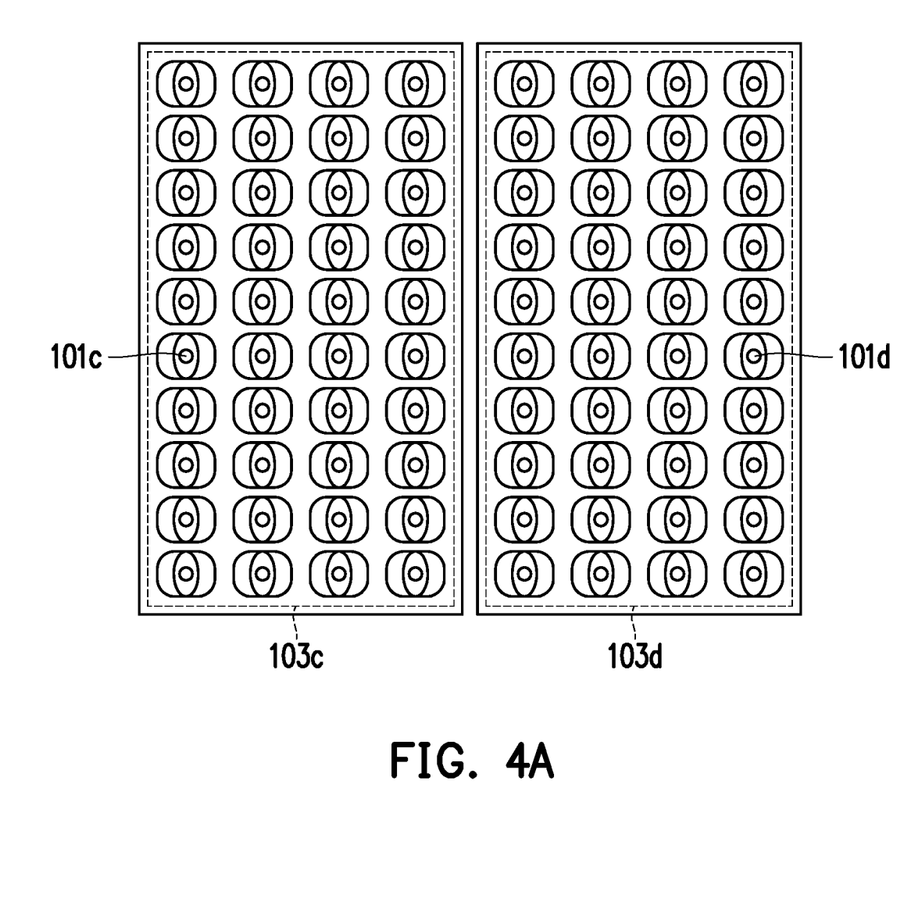
FIG. 4A is a schematic view illustrating adjustment of a light emitting module according to an embodiment of the invention.
Figure 4B:
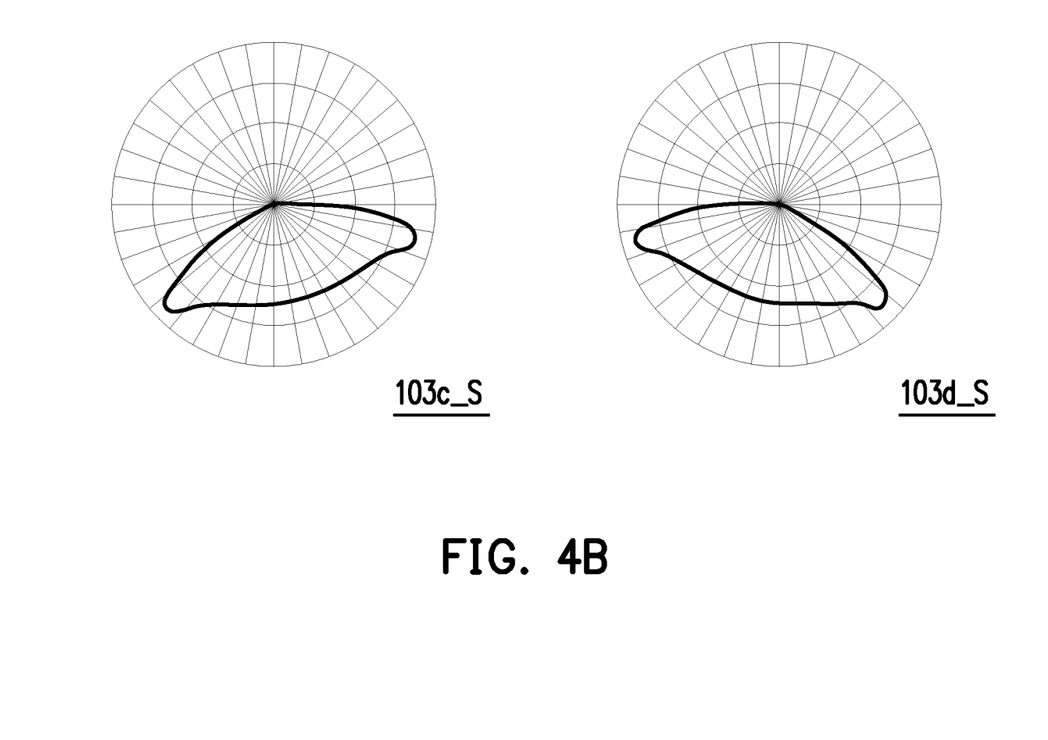
FIG. 4B is a schematic view illustrating a plurality of light patterns according to an embodiment of the invention.

FIG. 4A is a schematic view illustrating adjustment of a light emitting module according to an embodiment of the invention, and FIG. 4B is a schematic view illustrating a plurality of light patterns according to an embodiment of the invention.

With reference to FIG. 4A and FIG. 4B, in this embodiment, the light pattern determination module 103 includes a first lens 103*c* and a second lens 103*d*, where the first lens 103*c* corresponds to a first light pattern 103*c*_S, and the second lens 103*d* correspond to a second light pattern 103*d*_S. In particular, the first light pattern 103*c*_S and the second light pattern 103*d*_S are both asymmetrical light patterns. In other embodiments, the first lens 103*c* and the second lens 103*d* may both be designed to generate symmetrical light patterns, which should not be construed as limitations of the scope of the invention.

In this embodiment, the light emitting module 101 includes a plurality of light emitting elements, and the light emitting elements are, for example, distributed in the light source region 115. In addition, as shown in FIG. 4A, a plurality of first light emitting elements 101*c* among the light emitting elements are disposed corresponding to the first lens 103*c*, and a plurality of second light emitting elements 101*d* among the light emitting elements are disposed corresponding to the second lens 103*d*. In other words, an illumination light pattern of an illumination light emitted by the first light emitting elements 101*c* and passed through the light pattern determination module 103 is determined by the first light pattern 103*c*_S, and an illumination light pattern of an illumination light emitted by the second light emitting elements 101*d* and passed through the light pattern determination module 103 is determined by the second light pattern 103*d*_S.

In this embodiment, the controller 105 adjusts an illumination ratio of the first light emitting elements 101*c* (i.e., the light emitting elements disposed corresponding to the first lens 103*c*) and the second light emitting elements 101*d* (i.e., the light emitting elements disposed corresponding to the second lens 103*d*) according to installation positions of these light emitting elements (i.e., according to positions of the light emitting elements corresponding to the first lens 103*c* or the second lens 103*d*). As such, the controller 105 can adjust an illumination light pattern of an overall illumination light emitted from the light emitting module 101 and passed through the light pattern determination module 103, and that the controller 105 can further control the illuminance distribution in the lighting region corresponding to the lighting device 100. More clearly, the controller 105 may individually control a lighting up number of the first light emitting elements 101*c* and a lighting up number of the second light emitting elements 101*d*, so as to control the illuminance distribution in the lighting region corresponding to the lighting device 100. In another embodiment, the controller 105 may further control magnitude of currents flowing through the first light emitting elements 101*c* and the second light emitting elements 101*d*, so as to adjust a light intensity ratio of the first light emitting elements 101*c* and the second light emitting elements 101*d*. Accordingly, the illuminance distribution in the lighting region corresponding to the lighting device 100 may also be changed in this way.

Note that the two embodiments provided above are merely exemplary, and the invention is not limited by the content of the two embodiments above. The following embodiments are provided to describe how the controller 105 controls the illumination light pattern of the lighting device 100, so details of how the controller 105 adjusts the light emitting module 101 and/or the light pattern determination module 103 are no longer provided.

The controller 105 may control the illumination light pattern of the lighting device 100 according to a plurality of conditions, so as to change the illuminance distribution in the lighting region corresponding to the lighting device 100.

With reference to FIG. 2A again, the communication module 107 is configured to receive a light pattern-related message from an external device. The controller 105 may adjust the light emitting module 101 and/or the light pattern determination module 103 according to the light pattern-related message, so as to control the illumination light pattern of the illumination light after the illumination light passes through the light pattern determination module 103.

For instance, the communication module 107 may include a wired Ethernet module, a wireless 3G module, a 4G module, a Bluetooth module, a wireless Wi-Fi module, a LoRa module, a SIGFOX module, a NB-IoT module, or modules adopting other communication technologies or a combination of the foregoing modules, and the invention is not limited thereto.

In some embodiments, the light pattern-related message includes, for example, the light pattern adjustment command. The communication module 107 receives the light pattern adjustment command from, for example, a remote host (e.g., the control host 300), and the controller 105 adjusts the illumination light pattern of the lighting device 100 according to the light pattern adjustment command.

In some embodiments, the light pattern-related message includes, for example, the current image corresponding to the lighting region of the lighting device 100. The communication module 107 obtains the current image corresponding to the lighting region of lighting device 100 from, for example, the image capturing device 200. The controller 105 may determine the current illuminance of the lighting region of the lighting device 100 in the current image and controls the illumination light pattern of the lighting device 100 according to the determined current illuminance. In some embodiments, the communication module 107 once again obtains the current image corresponding to the lighting region of the lighting device 100 from, for example, the image capturing device 200 and once again determines the current illuminance of the lighting region of the lighting device 100 in the current image. The communication module 107 then controls the illumination light pattern of the lighting device 100 according to the determined current illuminance until the current illuminance distribution of the current image meets a predetermined illuminance request.

With reference to FIG. 2A again, the environmental detector 109 is configured to obtain a current environmental condition of surrounding environment of the lighting device 100, and the controller 105 may adjust the light emitting module 101 and/or the light pattern determination module 103 according to the current environmental condition, so as to control the illumination light pattern of the illumination light passed through the light pattern determination module 103. Taking FIG. 3A for example, when the controller 105 determines that it is sunny currently according to the current environmental condition, the controller 105 adjusts, for example, the relative position between the light emitting module 101 and the light pattern determination module 103, so that the positions of the light emitting elements 101a and 101b of the light emitting module 101 correspond to the first lens 103a. When the controller 105 determines that it is raining currently according to the current environmental condition, the controller 105 adjusts, for example, the relative position between the light emitting module 101 and the light pattern determination module 103, so that the positions of the light emitting elements 101a and 101b of the light emitting module 101 correspond to the second lens 103b. In this embodiment, the environmental detector 109 may be, for example, a temperature or humidity detector or a combination of various types of detectors, which is not limited by the invention.

Figure 5:
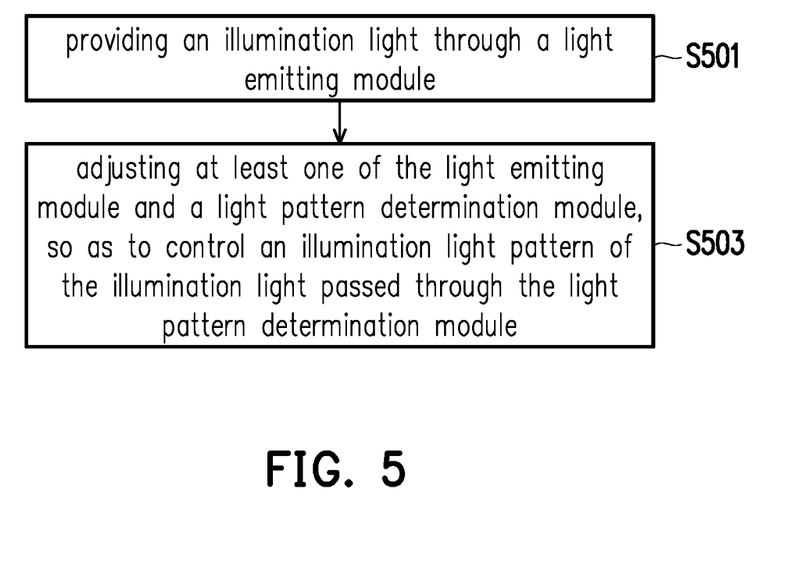
FIG. 5 is a flow chart illustrating a lighting method according to an embodiment of the invention.

FIG. 5 is a flow chart illustrating a lighting method according to an embodiment of the invention.

The lighting method of the embodiment of FIG. 5 is adapted to each of the lighting devices 100, 100A, 100B, 100C, and 100D in FIG. 1 and FIG. 2, the following refer to the elements of the lighting device 100 to describe each of the steps. In addition, specific implementation of each of the steps in the embodiment of FIG. 5 is described in detail in the foregoing one or multiple embodiments, and related description is thus omitted herein.

With reference to FIG. 5, the lighting device 100 provides the illumination light first through the light emitting module 101 (step S501) and adjusts at least one of the light emitting module 101 and the light pattern determination module 103 next, so as to control the illumination light pattern of the illumination light passed through the light pattern determination module 103 (step S503).

In view of the foregoing, in the lighting device, the lighting method, and the lighting system provided by the embodiments of the invention, two types of lenses corresponding to different light patterns are disposed in the light pattern determination module. As such, the illumination light pattern of the illumination light emitted from the light emitting module and passed through the light pattern determination module can thereby be controlled through adjusting at least one of the light emitting module and the light pattern determination module, and that the illuminance distribution of the corresponding lighting region is adaptively adjusted. In addition, in the embodiments of the invention, the image capturing device is used to obtain the current image of the lighting region, so that the lighting device may accordingly adjust the current illuminance distribution in the lighting region until the current illuminance distribution meets the predetermined illuminance request. Therefore, the lighting device, the lighting method, and the lighting system provided by the embodiments of the invention may be applied to various weather and environmental conditions, so that the illuminance distribution in the lighting region is maintained to be symmetrical and even.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A lighting device, comprising:
a light emitting module, configured to emit an illumination light;
a light pattern determination module, comprising a first lens and a second lens, wherein the first lens corresponds to a first light pattern, the second lens corresponds to a second light pattern, and the first light pattern is different from the second light pattern; and
a controller, coupled to the light emitting module and the light pattern determination module, configured to adjust at least one of the light emitting module and the light pattern determination module, so as to control an illumination light pattern of the illumination light passed through the light pattern determination module,
wherein the light emitting module comprises a plurality of first light emitting elements disposed corresponding to the first lens and a plurality of second light emitting elements disposed corresponding to the second lens,
wherein when adjusting at least one of the light emitting module and the light pattern determination module, the controller further:
adjusts an illumination ratio of the first light emitting elements and the second light emitting elements according to an installation position of the first light emitting elements and the second light emitting elements, wherein the illumination ratio is related to a magnitude of a current flowing through the first light emitting elements and the second light emitting elements.

2. The lighting device as claimed in claim 1, wherein when adjusting at least one of the light emitting module and the light pattern determination module, the controller further:
adjusts a relative position between the light pattern determination module and the light emitting module.

3. The lighting device as claimed in claim 2, further comprising:
a motor, coupled to at least one of the light pattern determination module and the light emitting module, configured to move at least one of the light pattern determination module and the light emitting module, wherein the motor is coupled to the controller.

4. The lighting device as claimed in claim 1, further comprising:
a communication module, coupled to the controller, configured to receive a light pattern-related message, wherein the controller is configured to adjust at least one of the light emitting module and the light pattern determination module according to the light pattern-related message, so as to control the illumination light pattern of the illumination light passed through the light pattern determination module.

5. The lighting device as claimed in claim 4, wherein the communication module receives the light pattern-related message from an image capturing device, and the light pattern-related message is a current image comprising a lighting region of the lighting device.

6. The lighting device as claimed in claim 5, wherein when adjusting at least one of the light emitting module and the light pattern determination module to control the illumination light pattern of the illumination light passed through the light pattern determination module, the controller further:
controls the illumination light pattern according to the current image so that a current illuminance distribution of the current image meets a predetermined illuminance request.

7. The lighting device as claimed in claim 4, wherein the communication module receives the light pattern-related message from a remote host, and the light pattern-related message is a light pattern adjustment command.

8. The lighting device as claimed in claim 1, further comprising:
an environmental detector, coupled to the controller, configured to obtain a current environmental condition, wherein the controller adjusts at least one of the light emitting module and the light pattern determination module according to the current environmental condition to control the illumination light pattern of the illumination light passed through the light pattern determination module.

9. A lighting method, adapted to a lighting device, wherein the lighting device comprises a light emitting module and a light pattern determination module, and the lighting method comprises:
providing an illumination light through the light emitting module; and
adjusting at least one of the light emitting module and the light pattern determination module, so as to control an illumination light pattern of the illumination light passed through the light pattern determination module, wherein the light pattern determination module comprises a first lens and a second lens, the first lens corresponds to a first light pattern, the second lens corresponds to a second light pattern, and the first light pattern is different from the second light pattern,
wherein the light emitting module comprises a plurality of first light emitting elements disposed corresponding to the first lens and a plurality of second light emitting elements disposed corresponding to the second lens, wherein the step of adjusting at least one of the light emitting module and the light pattern determination module further comprises:
adjusting an illumination ratio of the first light emitting elements and the second light emitting elements according to an installation position of the first light emitting elements and the second light emitting elements, wherein the illumination ratio is related to a magnitude of a current flowing through the first light emitting elements and the second light emitting elements.

10. The lighting method as claimed in claim 9, wherein the step of adjusting at least one of the light emitting module and the light pattern determination module comprises:
adjusting a relative position between the light pattern determination module and the light emitting module.

11. The lighting method as claimed in claim 9, further comprising:
receiving a light pattern-related message, wherein the step of adjusting at least one of the light emitting module and the light pattern determination module comprises:
adjusting at least one of the light emitting module and the light pattern determination module according to the light pattern-related message.

12. The lighting method as claimed in claim 11, wherein the step of receiving the light pattern-related message comprises:
receiving the light pattern-related message from an image capturing device, wherein the light pattern-related message is a current image comprising a lighting region of the lighting device.

13. The lighting method as claimed in claim 12, wherein the step of adjusting at least one of the light emitting module and the light pattern determination module comprises:
controlling the illumination light pattern according to the current image so that a current illuminance distribution of the current image meets a predetermined illuminance request.

14. The lighting method as claimed in claim 11, wherein the step of receiving the light pattern-related message comprises:
receiving the light pattern-related message from a remote host, wherein the light pattern-related message is a light pattern adjustment command.

15. The lighting method as claimed in claim 9, further comprising:
obtaining a current environmental condition, wherein the step of adjusting at least one of the light emitting module and the light pattern determination module comprises:
adjusting at least one of the light emitting module and the light pattern determination module according to the current environmental condition.

16. A lighting system, comprising:
at least one lighting device, wherein each lighting device comprises:
a light emitting module, configured to emit an illumination light;
a light pattern determination module, comprising a first lens and a second lens, wherein the first lens corresponds to a first light pattern, the second lens corresponds to a second light pattern, and the first light pattern is different from the second light pattern; and a controller, coupled to the light emitting module and the light pattern determination module, configured to adjust at least one of the light emitting module and the light pattern determination module according to a light pattern adjustment command, so as to control an illumination light pattern of the illumination light passed through the light pattern determination module; and a control host, coupled to the at least one lighting device, configured to generate the light pattern adjustment command, wherein the light emitting module comprises a plurality of first light emitting elements disposed corresponding to the first lens and a plurality of second light emitting elements disposed corresponding to the second lens, wherein when adjusting at least one of the light emitting module and the light pattern determination module, the controller further:

adjusts an illumination ratio of the first light emitting elements and the second light emitting elements according to an installation position of the first light emitting elements and the second light emitting elements, wherein the illumination ratio is related to a magnitude of a current flowing through the first light emitting elements and the second light emitting elements.

17. The lighting system as claimed in claim 16, further comprising:

at least one image capturing device, coupled to the control host, configured to obtain a current image comprising a lighting region of the at least one lighting device, wherein the control host is configured to generate the light pattern adjustment command according to the current image, so as to control the at least one lighting device so that a current illuminance distribution of the current image meets a predetermined illuminance request.

18. The lighting system as claimed in claim 16, wherein the control host is configured to generate the light pattern adjustment command according to a current environmental condition.

* * * * *